June 14, 1949.  W. H. WANNAMAKER, JR  2,473,494
ELECTRIC MOTOR CONTROL APPARATUS
Filed Dec. 12, 1945  2 Sheets-Sheet 1

*INVENTOR.*
WILLIAM H. WANNAMAKER JR.
BY *Arthur H. Swanson*
ATTORNEY.

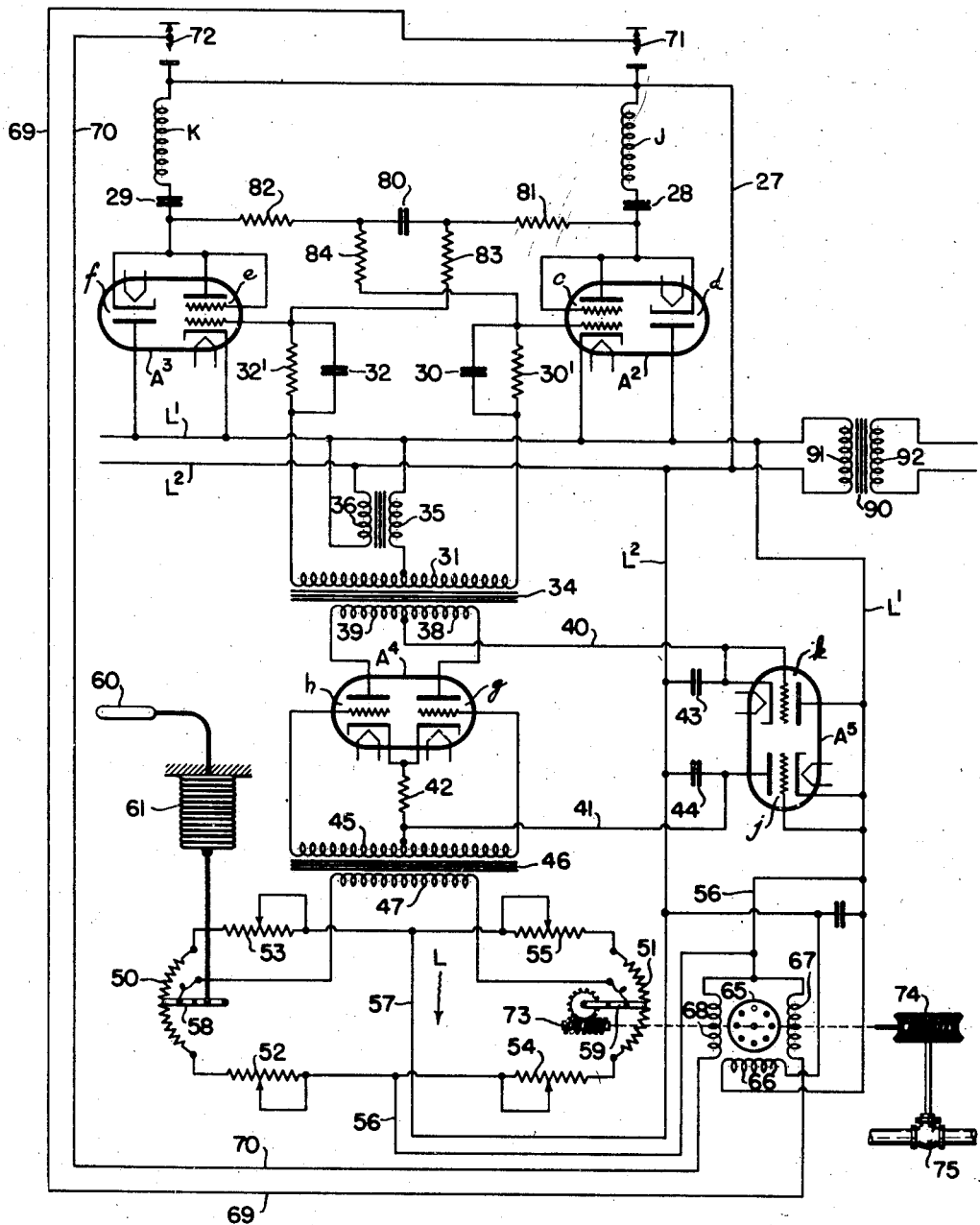

Patented June 14, 1949

2,473,494

UNITED STATES PATENT OFFICE 2,473,494

ELECTRIC MOTOR CONTROL APPARATUS

William H. Wannamaker, Jr., Flourtown, Pa., assignor, by mesne assignments, to Minneapolis-Honeywell Regulator Company, Minneapolis, Minn., a corporation of Delaware Application December 12, 1945, Serial No. 634,558

9 Claims. (Cl. 318—207)

1

The general object of the present invention is to provide simple and effective control apparatus characterized by the novel manner in which two electronic valve units are combined to utilize full wave alternating current energy in selectively energizing one or another of a pair of electromagnetic relays or windings on a variation in a controlling quantity from its normal value in one direction or the other, respectively.

In carrying out the present invention, I employ electronic valve units of the type disclosed and claimed in my prior application Serial No. 541,576, filed June 22, 1944. Each such unit comprises a diode and a grid controlled valve inversely connected to a source of alternating current, and a condenser in series with said valves. Such a unit is operative to supply energy at a rate regulated through the input circuit of the grid controlled valve to a relay winding or other inductive load during each half of each alternating current cycle.

A primary object of the present invention is to provide a control system means interconnecting two such valve units to obtain desirable conjoint operation of the two units.

One specific object of the present invention is to interconnect the associated valve units in the energizing circuit of a reversible alternating current motor of known type in such manner that the direction and speed of operation of the motor may be regulated by control means associated with the input circuit of the grid controlled valve of one unit while at the same time permitting the full motor energizing capacity of each unit to be utilized.

Another specific object of the invention is to provide an interconnection between the grid controlled valve input circuits of the two valve units included in an electrical proportioning control system adapted to provide a rate component in the control action which will minimize risk of hunting and over-travel in the characteristic bridge rebalancing operation of such a control system.

Of the drawings:

Fig. 2 is a diagrammatic representation of a second form of control system, and

Figure 1:
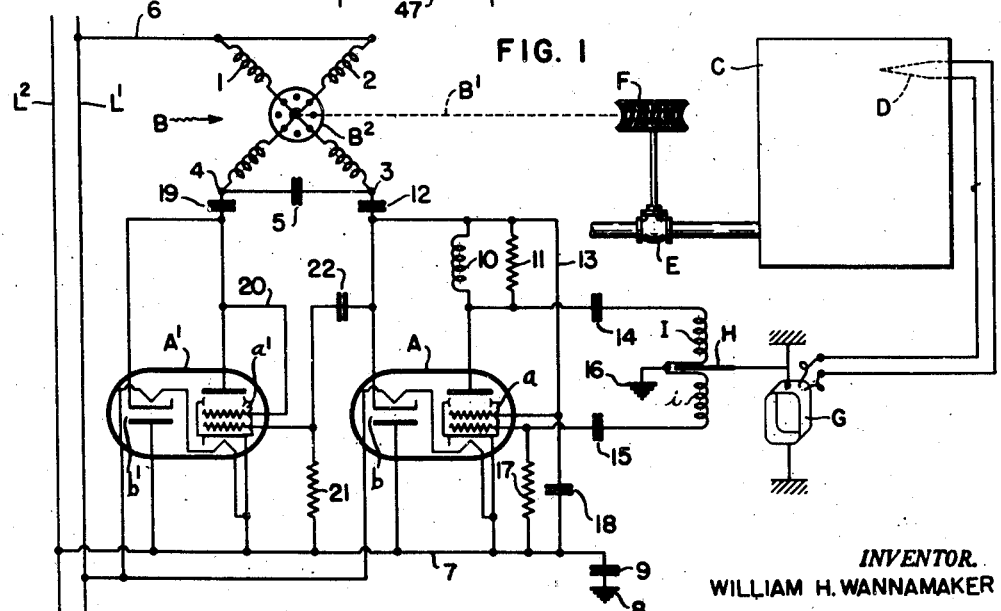
Fig. 1 is a diagrammatic representation of a control system.

In Fig. 1 I have illustrated an embodiment of the present invention in which two valve units A and A', each in the form of a diode-tetrode electronic tube, control the energization of a reversible alternating current motor B of known capacitor induction type. As shown in Fig. 1, the motor B is employed to make control adjustments in accordance with variations in the output of the tube A automatically produced by variations in a controlling quantity or condition. As diagrammatically shown, by way of exmple, the motor B regulates the supply of fluid fuel to a furnace C in direct accordance with variations in the furnace temperature to which a thermocouple D is subjected. The motor B regulates the furnace fuel by adjusting a valve E in the fuel supply line through a worm and gear connection F between the valve spindle and the motor shaft B'. As diagrammatically shown, the thermocouple D is connected to a deflecting galvanometer G which angularly adjusts a control element H into different positions and thereby controls the output of the valve A as hereinafter described. The control system shown in Fig. 1 is connected to and energized by alternating current supply conductors L1 and L2.

The motor B shown in Fig. 1 comprises a squirrel cage rotor B² and two field windings 1 and 2 arranged at right angles to each other and each comprising two sections, one at one side and the other at the opposite side of the rotor B². The end terminal 3 of the field winding 1 and the end terminal 4 of the field winding 2 are connected by a condenser 5. The other terminals of the field windings 1 and 2 are connected by a conductor 6 to supply conductor L1. The motor terminals 3 and 4 are connected to the supply conductor L2 through the tubes A and A', respectively. The alternating potentials impressed upon the terminals 3 and 4 through the valves A and A', respectively, are in phase or approximately in phase, but by adjustment of the controlling element H the potential of the terminal 3 may be made higher or lower than the potential of the motor terminal 4. In the type of motor shown, the field windings 1 and 2 are adapted to create a magnetic field which will rotate in one direction or in the opposite direction accordingly as the alternating potential drop in the winding 1 is respectively less or greater than the alternating potential drop in the winding 2.

The tube A includes a tetrode valve $a$ and a diode valve $b$ which are inversely connected between the supply conductor L2 and the motor terminal 3. As shown, the cathode of the valve $a$ and the anode of the valve $b$ are connected to a branch 7 of the supply conductor L2, the branch conductor 7 being connected to ground at 8 through a condenser 9. The tube A may well be of the type and form known as the rectifier-beam power amplifier tube 117N7–GT. The anode of the valve a of tube A is connected by a choke coil 10 and by a resistance 11 in parallel with the choke coil to one terminal of a condenser 12. The latter has its second terminal connected to motor terminal 3.

The connected terminals of choke coil 10, resistance 11 and condenser 12 are connected by a conductor 13 to the screen grid of the valve a. The anode of valve a is directly connected through a condenser 14 to one terminal of an inductive winding I which has its other terminal connected to one terminal of an inductive winding i. The latter has its second terminal connected by a condenser 15 to the control grid of the valve a. The connected ends of the coils I and i are connected to ground at 16. The connected ends of the control grid and condenser 15 are connected to the conductor 7 through a resistance 17. As shown, the screen grid of the valve a is connected to the conductor 7 through a condenser 18.

The tube A' may be a duplicate of the tube A. The diode valve b' of the tube A' is connected between the conductor 7 and one terminal of a condenser 19 which has its second terminal connected to the motor terminal 4. The cathode of valve a' and the anode of the diode valve b' of the tube A', are each connected to conductor 7. The cathode of the diode b' and the anode of valve a' are each directly connected to the condenser 19. The anode of the valve a' is also connected by a conductor 20 to the screen grid of the valve. The valve a' has its control grid connected to the conductor 7 by a resistance 21 and is not associated with parts analogous to the parts 10, 11, 14, 15, 16 and 18 associated with the valve a. As shown, the tubes A and A' are coupled by a condenser 22 having one terminal connected to the portion of the output circuit of the tube A connecting the latter to the condenser 12 and having its other terminal connected to the control grid of the valve a'.

The coils I and i and condensers 14 and 15 are so relatively proportioned and arranged that the valve a will or will not oscillate accordingly as the control element H is in one position or another relative to said coils. As explained in my prior application Serial No. 541,576, the element H may be a vane or plate-like body of aluminum, copper or other conducting metal, and is movable between a position in which it is interposed between the two coils I and i and reduces their mutual inductance to a value too small to permit or effect oscillation of the valve a, and a position in which the vane is not so interposed between the coils I and i that it prevents the mutual inductance of the coils from being great enough to cause the valve a to oscillate. Through a certain intermediate portion of the range of deflection of the control element H, change in the temperature of the thermocouple D, may cause the valve a to oscillate with a frequency which increases and decreases as the element H moves towards and away from the position in which it is directly interposed between the coils I and i. The space or plate current of the valve a is much greater when the tube is not oscillating than when it is oscillating, and when the valve a is oscillating its space current may be decreased and increased through a considerable range by increasing and decreasing the oscillation frequency.

Although the valves a and b are conductive during alternating half cycles, the control of the output current of the valve a, effected by the vane H, controls the output of the valve b. This results from the fact that the potential of the condenser 12, built up by the conduction of the valve a during its half cycles of line operation, controls the conductivity of the diode valve b during the half cycles in which current flows from it to the condenser.

The tubes A and A' are so arranged and operated that the potential drop in the field winding 1 will be less or greater than the potential drop in the field winding 2, accordingly as the valve a is or is not oscillating. In consequence, the rotor of the motor B will turn in one direction when the vane H is in the position in which it is directly interposed between the coils I and i, and will rotate in the opposite direction when the control element H is so displaced from the last mentioned position that the mutual inductance of the coils I and i is sufficiently great to cause oscillation of the valve a.

With the condensers 12 and 19 suitably proportioned the omission of the coupling including the condenser 22 will leave the arrangement shown in Fig. 1 operative to rotate the motor B in one direction or the other accordingly as the valve a is or is not in oscillation. Indeed, the arrangement shown in Fig. 1, modified by the omission of said coupling, and also by the replacement of the electronic valve unit A' by a simple resistor will be operative to effect motor rotation in one direction or the other accordingly as the valve a is or is not in oscillation. However, with such modification the motor power output will only be one-half as great as is obtainable with the output circuit of the valve b coupled to the input circuit a' as shown in Fig. 1.

In Fig. 2, I have illustrated a use of the present invention in which one or the other of relays J and K is energized when a control quantity varies in one direction or the other. As diagrammatically shown, the relays J and K are similar electromagnetic switches and the energizable element of each relay is the magnetizing coil or actuating winding of the relay. The relays J and K may be of the mercury switch type shown in my prior application Ser. No. 541,576, or they may be electromagnetic relay switches of any other usual or suitable form. The coil element of relay J has one terminal connected by a conductor 27 to the alternating current supply conductor L2, and has its second terminal connected by a condenser 28 and an electronic unit $A^2$ to the supply conductor L'. The relay K has one terminal connected to the conductor 27 and thereby to supply conductor L2, and has its second terminal connected through a condenser 29 and an electronic unit $A^3$ to the supply conductor L'. Each of the electronic units $A^2$ and $A^3$ may be identical with the units A and A' of Fig. 1. For convenience of description, however, the tetrode and diode valves of the unit $A^2$ are designated c and d, respectively, and the tetrode and diode valves of the unit A are designated e and f, respectively.

In respect to their external connections, the units $A^2$ and $A^3$ differ from the unit A' of Fig. 1 only in the means for impressing control signals on the control grids of the tetrode valves of the different units. As shown, the control grid of the valve c is connected to one terminal of a regulator coil 31 through an anti-hunting unit or element which comprises a condenser 30 and a resistance 30' connected in parallel to said condenser. The control grid of the unit $A^3$ is connected to the second terminal of the coil 31 through an anti-hunting unit or element comprising a condenser 32 and a resistance 32' in parallel with said condenser. As shown, the coil 31 forms the secondary winding of an inductive regulator or transformer 34. An alternating current bias is impressed on the grids of the valves c and e by means including a transformer having one terminal of its secondary winding 35 connected to the midpoint of the coil 31, and having its other terminal connected to the supply conductor L1. The primary winding 36 of the last mentioned transformer is connected between the supply conductors L1 and L2.

The primary winding of the inductive regulator 34 comprises two similar sections or coils 38 and 39 which are connected in series between the anodes of two similar triodes g and h included in an electronic unit $A^4$. The connected windings 38 and 39 are in inductive relation with winding 31 so that the output currents of the units $A^2$ and $A^3$ may be controlled by pulsating currents flowing through the winding sections 38 and 39, respectively. The connected ends of the windings 38 and 39 are connected to the positive terminal conductor 40 of the doubler $A^5$, and the negative terminal conductor 41 of the latter is connected through a resistance 42 to the cathodes of the valves g and h. The voltage doubler $A^5$ comprises triodes j and k. The positive terminal conductor 40 is connected to the cathode of the triode k. Said cathode is also connected by a condenser 43 to the alternating current supply conductor L2. The negative terminal conductor 41 is connected to the anode of the valve j, said anode being connected also through a condenser 44 to the supply conductor L2. The anode of the valve k and cathode of the valve j are connected to the supply conductor L1. The triodes j and k have grids connected directly to the cathodes of the valves. The control grids of the valves g and h of the unit $A^4$ are connected to the opposite ends of a winding 45 which has its midpoint connected through the resistance 42 to the cathodes of said valves. The winding 45 forms the secondary winding of a transformer 46 having a primary winding 47. The push-pull amplification obtained with the electronic unit $A^4$, minimizes the effect of ripples in the voltage doubler $A^5$ power supply.

The energization of the relays J and K is controlled by alternating control or signal voltage impressed on the primary winding 47. As diagrammatically shown in Fig. 2, a control or signal voltage is impressed upon the winding 47 through a bridge circuit L comprising slide wire resistances 50 and 51, regulable resistances 52 and 53 connected to the opposite ends of the resistance 50 and regulable resistances 54 and 55 connected to the opposite ends of the resistances 51. The regulable resistances 52 and 54 are connected in series between the one end of the resistance 50 and one end of the resistance 51. The regulable resistances 53 and 55 are connected in series between the other ends of the resistances 50 and 51. The bridge L is energized by means comprising a conductor 56 which connects the connected ends of the resistances 52 and 54 to the alternating current supply conductor L1, and a conductor 57 which connects the connected ends of the resistances 53 and 55 to the supply conductor L2. By suitable adjustments of the various regulable resistances 52, 53, 54 and 55, the potentials of the ends of the slide wire resistances 50 and 51 may be varied so as to calibrate the bridge as conditions make desirable.

Slider contacts 58 and 59 engage and are adjustable along the slide wire resistances 50 and 51, respectively. The slider contact 58 is the controlling bridge element and is adjusted along the resistance 50 in accordance with changes in a controlling quantity or condition such as a pressure, temperature or rate of flow. As diagrammatically shown by way of example in Fig. 2, the controlling condition is the temperature impressed on a thermometer bulb 60. The fluid pressure in the bulb, which varies when the bulb temperature varies, is transmitted to a bellows element 61 having its movable end connected to the slider contact 58, so that the latter is moved up or down as seen in Fig. 2 as the temperature of the bulb 60 falls or rises, respectively.

The slider contact 59 is shown in Fig. 2 as adjusted along the resistance 51 by the rotation of the rotor of a reversible electric control motor 65 having a main winding 66 connected to the supply conductors L1 and L2 and having control windings 67 and 68. The motor rotates in one direction or the other accordingly as one or the other of its control windings is energized. As shown, one end of each of the control windings 67 and 68 is connected to the supply conductor L1 through the conductor 56. The other ends of the windings 67 and 68 are connected by conductors 69 and 70, respectively, to contacts 71 and 72, respectively. As diagrammatically shown in Fig. 2, the contacts 71 and 72 are biased to their open positions and are moved into their closed positions by the energization of the relays J and K, respectively. When the relay J is energized, the contact 71 connects the conductor 69 to the conductor 27 and thereby to the supply conductor L2 and thus energizes the motor control winding 67 and causes the motor 65 to rotate in one direction. When the relay K is energized, the switch contact 72 is pulled down and connects the conductor 70 to the conductor 27 thereby energizing motor control winding 68 and causing the motor 65 to rotate in the direction opposite to that in which it rotates when the winding 67 is energized. As shown diagrammatically in Fig. 2, the shaft of the motor 65 is connected through separate worm and gear connections 73 and 74 respectively, to the slider contact 59 and to a regulating device 75. As shown, the latter is a valve which may be used, for example, to regulate the supply of fuel to a heater, not shown, in response to variations in temperature to which the bulb 60 may be responsive. The contacts 58 and 59 are connected to the control or primary winding 47 of the transformer 46 through which current does or does not flow, according as the potentials of the contacts 58 and 59 differ, or are equal.

The bridge circuit L, the means moving the contact 58 in a direction and to an extent depending upon the direction and magnitude of change in a controlling condition, and the control motor 65 are essential elements of mechanism for adjusting the contact 59 and regulator 75 of an electric proportioning control system which is characterized by the special apparatus through which the motor 65 is energized to adjust the contact 59 in the direction and to the extent required to rebalance the bridge and interrupt current flow through the winding 47 following an adjustment of the contact 58 in response to a change in the control condition. On the assumption that the apparatus shown in Fig. 2 operates to give opening and closing adjustments to the valve 75 proportional to the decreases and increases, respectively, in the temperature of the bulb 68, the motor 65 should be arranged to move the slider contact 59 up and down along the resistance 51 as the bellows 61 moves the contact 58 respectively up and down along the resistance 50.

In the normal balanced condition of the bridge L, the position of the contact 59 is so related to the position of the contact 58 that the two contacts do not significantly differ in potential so that there is then no current flow through the control winding. On a variation in the temperature of the bulb 68 and resultant adjustment of the contact 58, the potential of that contact will be raised or lowered relative to the potential of the contact 59, depending on whether the adjustment of the contact 58 is in one direction or the other. The potential difference between the contacts 58 and 59 will create an alternating current flow through the winding 47 and will thereby induce an alternating voltage in the winding 45. This will make the valves $g$ and $h$ conductive during alternate half cycles and will create current pulsations in the windings 38 and 39 and thereby induce alternating voltages in the winding 31. That voltage will be in phase, or 180° out of phase, with the voltage of the supply conductors L1 and L2, depending on which of the bridge contacts 58 and 59 has increased in potential relative to the other.

In the arrangement shown in Fig. 2, a rate component, or anticipatory action to prevent hunting is obtained by the use of a condenser 80 and resistances 81, 82, 83, 84 in conjunction with resistances 30' and 32'. The condenser 80 has one terminal connected by the resistance 81 to the anode of valve $c$ and cathode of valve $d$, and the other terminal of the condenser 80 is connected by a resistance 82 to the anode of the valve $e$ and cathode of the valve $f$. The terminal of the resistance 81 connected to the condenser 80, is also connected through the resistance 83 to the control grid of the valve $e$. The terminal of the resistance 82 connected to the condenser 80 is also connected by the resistance 84 to the control grid of the valve $c$.

With the resistance and condenser connections just described, whenever either of the valve units A² and A³ is operatively energized, voltage builds up across the condenser 80. That voltage subjects the control grid of whichever of tetrode valves $c$ and $e$ is then operatively energized, to a bias action in the direction to de-sensitize that tetrode and make it become non-conductive more quickly than it otherwise would. With the arrangement described, the application of the de-sensitizing bias is sufficiently delayed to insure positive relay action. The described anticipatory provisions do not prevent a suitably rapid adjustment of the contact 59 into its balancing position, but tend to break up a required rebalancing movement of substantial extent into a plurality of steps which diminish in magnitude as final balance is approached.

As shown in Fig. 2, a transformer 90 having its primary winding 91 connected across supply conductors L1 and L2, has a secondary winding 92 adapted to supply heating current to filaments of various valves $a$—$k$. To simplify the drawings, the conductor connections between said filaments and the transformer secondary 92 are not shown.

Figure 3:
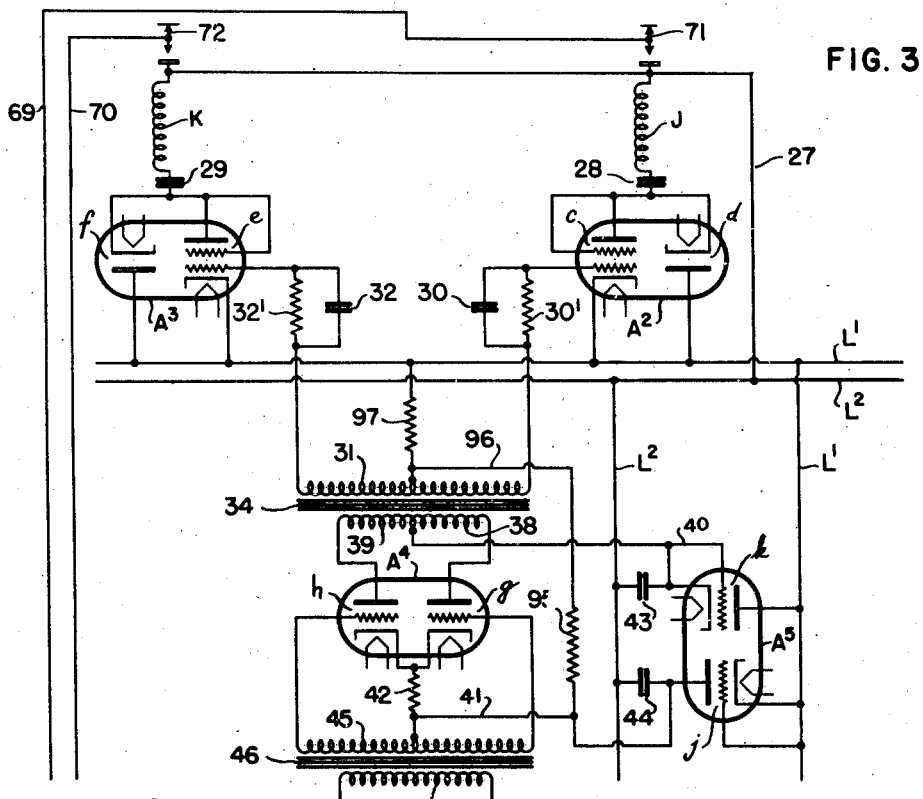
Fig. 3 is a diagrammatic representation of a modification of the control system shown in Fig. 2.

The form of the invention shown in Fig. 3 differs from that shown in Fig. 2 essentially only in that it omits the condenser 80 and resistances 81, 82, 83 and 84 of Fig. 2, and includes means for impressing a steady D. C. bias on the midpoint of the winding 31. To this end the negative terminal of the voltage doubler A⁵ is connected through a resistance 95 and conductor 96 to the midpoint of the winding 31, and that midpoint is also connected by resistance 97 to the alternating current supply conductor L1.

With a steady direct current bias impressed on the control grids of the valves $c$ and $e$ of Fig. 3 as a result of the current flowing in the resistors 95 and 97, the anti-hunting units comprising condenser 30 and resistance 30' and condenser 32 and resistance 32' negatively bias the control grids of the valves $c$ and $e$ slowly for any control signal current flowing through the winding 47. Such slow negatively biasing action on the control grids of the units A² and A³ of Fig. 3 produce rate component, anticipatory effects which tend to prevent over-travel and hunting by causing final control circuit balance to be attained in short steps.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. A control system comprising in combination a regulating mechanism including two windings and adapted to produce different effects accordingly as one or another of said windings is operatively energized, energizing means separately associated with each of said windings and comprising a condenser, an electronic valve unit and connecting means for connecting the winding and its associated condenser and valve unit in series to a source of alternating current, each of said valve units comprising a diode valve and a valve having a control grid and comprising an input circuit including the control grid and cathode of the control grid valve, and an output circuit including the anodes and cathodes of both valves of the unit, the two valves of each unit being inversely connected to pass current in opposite directions through the associated winding and condenser during successive half cycles of alternating current supplied by said source, and means actuated by a change in a control quantity for impressing a control signal on the input circuit of one or the other of said control grid valves accordingly as said change is in one direction or in the opposite direction.

2. A control system comprising in combination a regulating mechanism including two windings and adapted to produce different effects accordingly as one or another of said windings is operatively energized, energizing means separately associated with each of said windings comprising a condenser, an electronic valve unit and connecting means for connecting the winding and its associated condenser and valve unit in series to a source of alternating current, each of said valve units comprising a diode valve and a valve having a control grid and comprising an input circuit including the control grid and cathode of the control grid valve, and an output circuit including the anodes and cathodes of both valves, of the unit the two valves of each unit being inversely connected to pass current in opposite directions through the associated winding and condenser during successive half cycles of alternating current supplied by said source, a resistance and a condenser in shunt to said resistance included in a portion of the input circuit of each valve unit external to the output circuit of that unit, and means actuated by a change in a control quantity for impressing a control signal on the input circuit of one or the other of said control grid valves accordingly as said change is in one direction or in the opposite direction.

3. A control system comprising in combination a regulating mechanism including two windings and adapted to produce different effects accordingly as one or another of said windings is operatively energized, energizing means separately associated with each of said windings and comprising a condenser, an electronic valve unit and connecting means for connecting the winding and its associated condenser and valve unit in series to a source of alternating current, each of said valve units comprising a diode valve and a valve having a control grid and comprising an input circuit including the control grid and cathode of the control grid valve, and an output circuit including the anodes and cathodes of both valves of the unit, the two valves of each unit being inversely connected to pass current in opposite directions through the associated winding and condenser during successive half cycles of alternating current supplied by said source, means actuated by a change in a control quantity for impressing a control signal on the input circuit of one or the other of said control grid valves accordingly as said change is in one direction or in the opposite direction, and a resistance coupling between the output circuit of one valve unit and the input circuit of the other valve unit.

4. A control system comprising in combination a regulating mechanism including two windings and adapted to produce different effects accordingly as one or another of said windings is operatively energized, energizing means separately associated with each of said windings and comprising a condenser, an electronic valve unit and connecting means for connecting the winding and its associated condenser and valve unit in series to a source of alternating current, each of said valve units comprising a diode valve and a valve having a control grid and comprising an input circuit including the control grid and cathode of the control grid valve and an output circuit including the anodes and cathodes of both valves of the unit, the two valves of each unit being inversely connected to pass current in opposite directions through the associated winding and condenser during successive half cycles of alternating current supplied by said source, means comprising an inductive winding having one terminal connected to one, and its other terminal connected to the second of the two control grids, and means selectively responsive to the magnitude and direction of change in a control quantity for inducing an alternating voltage in said inductive winding of a magnitude varying with the magnitude of said change and which is in phase with, or 180° out of phase with, the voltage of said source accordingly as said change is in one direction or in the opposite direction.

5. A control system comprising in combination a regulating mechanism including two windings and adapted to produce different effects accordingly as one or another of said windings is operatively energized, energizing means separately associated with each of said windings and comprising a condenser, an electronic valve unit and connecting means for connecting the winding and its associated condenser and valve unit in series to a source of alternating current, each of said valve units comprising a diode valve and a valve having a control grid and comprising an input circuit including the control grid and cathode of the control grid valve and an output circuit including the anodes and cathodes of both valves of the unit, the two valves of each unit being inversely connected to pass current in opposite directions through the associated winding and condenser during successive half cycles of alternating current supplied by said source, and means actuated by a change in a control quantity for impressing a valve energizing control signal on the input circuit of one or the other of said control grid valves, accordingly as said change is in one direction or in the opposite direction, said means comprising a bias winding having one terminal connected to one, and having its second terminal connected to the second of said control grids, means for impressing an alternating bias voltage in phase with voltage of said source on an intermediate point of said bias winding, and means for inducing an alternating voltage in said bias winding which is in phase with or 180° out of phase with the first mentioned voltage accordingly as said change is in one direction or in the opposite direction.

6. A control system comprising in combination a regulating mechanism including two windings and adapted to produce different effects accordingly as one or another of said windings is operatively energized, energizing means separately associated with each of said windings and comprising a condenser, an electronic valve unit and connecting means for connecting the winding and its associated condenser and valve unit in series to a source of alternating current, each of said valve units comprising a diode valve and a valve having a control grid and comprising an input circuit including the control grid and cathode of the control grid valve, and an output circuit including the anodes and cathodes of both valves of the unit, the two valves of each unit being inversely connected to pass current in opposite directions through the associated winding and condenser during successive half cycles of alternating current supplied by said source, means actuated by a change in a control quantity for impressing a control signal on the input circuit of one or the other of said control grid valves accordingly as said change is in one direction or in the opposite direction, a third condenser, two resistances, one connecting one terminal of said third condenser to one, and the other resistance connecting the second terminal of the third condenser to the second of said output circuits, and a coupling connection between the input circuit of one valve unit and the output circuit of the other valve unit including the said resistance through which that output circuit is connected to said third condenser.

7. A control system comprising in combination a regulating mechanism including two windings and adapted to produce different effects accordingly as one or another of said windings is operatively energized, energizing means separately associated with each of said windings and comprising a condenser, an electronic valve unit and connecting means for connecting the winding and its associated condenser and valve unit in series to a source of alternating current, each of said valve units comprising a diode valve and a valve having a control grid and comprising an input circuit including the control grid and cathode of the control grid valve, and an output circuit including the anodes and cathodes of both valves of the unit, the two valves of each unit being inversely connected to pass current in opposite directions through the associated winding and condenser during successive half cycles of alternating current supplied by said source, and means actuated by a change in a control quantity for impressing an energizing signal voltage on the input circuit of one or the other of said control grid valves accordingly as said change is in one direction or the opposite direction, said means comprising a pair of triode valves having their cathodes directly connected, one inductive winding connecting the anodes of said triodes, a second inductive winding connected to the cathodes of said triodes, a third inductive winding in inductive relation with said one inductive winding and having one terminal connected to one and having its second terminal connected to the other of said control grids, a resistance connecting the midpoint of said third inductive winding to the cathodes of the control grid valves, a source of direct current having its positive terminal connected to the midpoint of said one inductive winding and having its negative terminal connected to the cathodes of said triodes and to the midpoints of said second and third inductive windings, and means for inducing an alternating voltage in said second inductive winding which is in phase with or 180° out of phase with the voltage of said source accordingly as said quantity change is in one direction or in the opposite direction.

8. A control system comprising a combination a regulating mechanism including two windings and adapted to produce different effects accordingly as one or another of said windings is operatively energized, energizing means separately associated with each of said windings and comprising a condenser, an electronic valve unit and connecting means for connecting the winding and its associated condenser and valve unit in series to a source of alternating current, each of said valve units comprising a diode valve and a valve having a control grid and comprising an input circuit including the control grid and cathode of the control grid valve and an output circuit including the anodes and cathodes of both valves of the unit, the two valves of each unit being inversely connected to pass current in opposite directions through the associated winding and condenser during successive half cycles of alternating current supplied by said source, and means actuated by a change in a control quantity for impressing an energizing signal voltage on the input circuit of one or the other of said control grid valves accordingly as said change is in one direction or the opposite direction, said means comprising a pair of triode valves having their cathodes directly connected, on inductive winding connecting the anodes of said triodes, a second inductive winding connected to the cathodes of said triodes, a third inductive winding in inductive relation with said one inductive winding and having one terminal connected to one and having its second terminal connected to the other of said control grids, a fourth inductive winding connecting the midpoint of said third inductive winding to the cathodes of the control grid valves, means for inducing in said fourth inductive winding an alternating bias voltage in phase with the voltage of said source, a source of direct current having its positive terminal connected to the midpoint of said one inductive winding and having its negative terminal connected to the cathodes of said triodes and to the midpoint of said second inductive winding, and means for inducing an alternating voltage in said second inductive winding which is in phase with or 180° out of phase with the voltage of said source accordingly as said quantity change is in one direction or in the opposite direction.

9. A control system as specified in claim 1, including a coupling between the output circuit including the anode and cathode of the valve having the control grid on which said signal is impressed, and the input circuit of the other valve having a control grid.

WILLIAM H. WANNAMAKER, Jr.

REFERENCES CITED

The following references are of record in the file of the patent.

UNITED STATES PATENTS

| Number | Name | Date |
|---|---|---|
| 2,126,910 | Moseley | Aug. 16, 1938 |
| 2,333,393 | Ryder | Nov. 2, 1943 |
| 2,349,963 | Harrison | May 30, 1944 |
| 2,351,760 | Beers | June 20, 1944 |
| 2,414,284 | Moseley | Jan. 14, 1947 |

FOREIGN PATENTS

| Number | Country | Date |
|---|---|---|
| 587,525 | Germany | Nov. 4, 1933 |